United States Patent
Jain et al.

(10) Patent No.: US 10,887,742 B2
(45) Date of Patent: Jan. 5, 2021

(54) CIOT ARCHITECTURE FOR EFFICIENT DATA TRANSMISSION

(71) Applicant: Apple Inc., Cupertino, CA (US)

(72) Inventors: Puneet K. Jain, Hillsboro, OR (US); Sneha Nagarajan, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/743,574

(22) PCT Filed: Mar. 24, 2016

(86) PCT No.: PCT/US2016/023994
§ 371 (c)(1),
(2) Date: Jan. 10, 2018

(87) PCT Pub. No.: WO2017/027071
PCT Pub. Date: Feb. 16, 2017

(65) Prior Publication Data
US 2018/0206093 A1   Jul. 19, 2018

Related U.S. Application Data

(60) Provisional application No. 62/209,591, filed on Aug. 25, 2015, provisional application No. 62/204,848, filed on Aug. 13, 2015.

(51) Int. Cl.
*H04W 4/70* (2018.01)
*H04L 29/08* (2006.01)
(Continued)

(52) U.S. Cl.
CPC .............. *H04W 4/70* (2018.02); *G06Q 99/00* (2013.01); *H04L 67/34* (2013.01); *H04W 8/04* (2013.01);
(Continued)

(58) Field of Classification Search
CPC .................................. H04W 4/70; H04W 8/04
See application file for complete search history.

(56) References Cited

U.S. PATENT DOCUMENTS 9,693,178 B2 * 6/2017 Adrangi ................ H04W 4/70
10,231,089 B2 * 3/2019 Ryu ........................ H04W 8/02
(Continued)

FOREIGN PATENT DOCUMENTS

WO   2016200357 A1   12/2016

OTHER PUBLICATIONS

3GPP TR 45.820 V1.4.0 (Jul. 2015); "Technical Specification Group GSM/EDGE Radio Access Network; Cellular System Support for Ultra Low Complexity and Low Throughput Internet of Things; (Release 13)"; 361 pages.
(Continued)

*Primary Examiner* — Gregory B Sefcheck
(74) *Attorney, Agent, or Firm* — Fish & Richardson P.C.

(57) ABSTRACT

Methods and apparatuses for communicating in a cellular communications network, including provision of a Service Capability Exposure Function (SCEF) for use in a cellular communications network, the SCEF comprising circuitry to: send and receive Application Packet Data Units (A-PDUs) over an interface interconnecting the SCEF and a Cellular Internet of Things Gateway (C-GW) combining the functionality of a Mobility Management Entity (MME), a Serving gateway (S-GW) and a Packet data network gateway (P-GW).

18 Claims, 8 Drawing Sheets

(51) Int. Cl.
  *H04W 8/04*      (2009.01)
  *G06Q 99/00*     (2006.01)
  *H04W 92/00*     (2009.01)
  *H04W 88/16*     (2009.01)

(52) U.S. Cl.
  CPC .............. *H04W 92/00* (2013.01); *H04L 67/02* (2013.01); *H04W 88/16* (2013.01)

(56) References Cited

U.S. PATENT DOCUMENTS

| | | | | |
|---|---|---|---|---|
| 10,271,191 | B2* | 4/2019 | Adrangi | H04W 4/70 |
| 10,321,497 | B2* | 6/2019 | Kim | H04W 76/12 |
| 10,548,000 | B2* | 1/2020 | Jain | H04W 60/00 |
| 2011/0213871 | A1 | 9/2011 | DiGirolamo et al. | |
| 2016/0373976 | A1* | 12/2016 | Griot | H04W 36/0072 |
| 2016/0374048 | A1* | 12/2016 | Griot | H04W 4/70 |
| 2018/0109941 | A1* | 4/2018 | Jain | H04W 60/00 |
| 2018/0150289 | A1* | 5/2018 | Adrangi | G06F 8/65 |
| 2018/0184246 | A1* | 6/2018 | Ryu | H04W 8/02 |
| 2018/0220289 | A1* | 8/2018 | Ryu | H04W 8/04 |
| 2018/0352416 | A1* | 12/2018 | Ryu | H04W 4/70 |
| 2019/0191295 | A1* | 6/2019 | Jain | H04W 92/10 |

OTHER PUBLICATIONS

International Search Report and Written Opinion for International Patent Application No. PCT/US2016/023994 dated Jun. 15, 2016; 15 pages.

ETSI; "Architechture Part 2: Study for the merging of architectures proposed for consideration by oneM2M," ETSI TW 118 503 V1.0.0 (Apr. 2015); 13 pages.

3GPP TR 23.720 V0.1.0 (Jul. 2015); "Technical Specification Group Services and System Aspects; Architecture enhancements for Cellular Internet of Things; (Release 13)," 54 pages.

3GPP TS 23.682 V13.2.0 (Jun. 2015); "Technical Specification Group Services and System Aspects; Architecture enhancements to facilitate communications with packet data networks and applications (Release 13)," 70 pages.

* cited by examiner

CIOT ARCHITECTURE FOR EFFICIENT DATA TRANSMISSION

CROSS REFERENCE TO RELATED APPLICATIONS

The present application is a national phase entry under 35 U.S.C. § 371 of International Application No. PCT/US2016/023994, filed Mar. 24, 2016, entitled "CIOT ARCHITECTURE FOR EFFICIENT DATA TRANSMISSION", which claims priority from U.S. Provisional Patent Application No. 62/209,591, filed Aug. 25, 2015, and entitled "SOLUTION FOR NON-IP DATA TRANSMISSION FOR CIOT SYSTEMS USING SCEF", and also from U.S. Provisional Patent Application No. 62/204,848, filed Aug. 13, 2015, and entitled "LIGHTWEIGHT S1-LITE PROTOCOL DESIGN FOR CELLULAR 10T", the entire disclosures of these documents being hereby incorporated by reference.

TECHNICAL FIELD

Configurations relate to wireless communications, and more particularly, to Cellular Internet of Things (C-IoT) architecture.

BACKGROUND

Ever greater demand is placed on telecommunication services, which are to accommodate increasingly more efficient and effective communication for increasing numbers of fixed and mobile devices.

In anticipation of the Cellular Internet of Things (CIoT), integrating over a cellular network a multitude of devices that may be severely constrained in terms of power, memory, processing, and many of which requiring only a small amount of data to be communicated at infrequent intervals, there is required network infrastructure that can efficiently support non-IP data delivery (NIDD).

BRIEF DESCRIPTION

Configurations described herein are illustrated, without limitation, by way of example, in the accompanying drawings.

DETAILED DESCRIPTION

Figure 1:
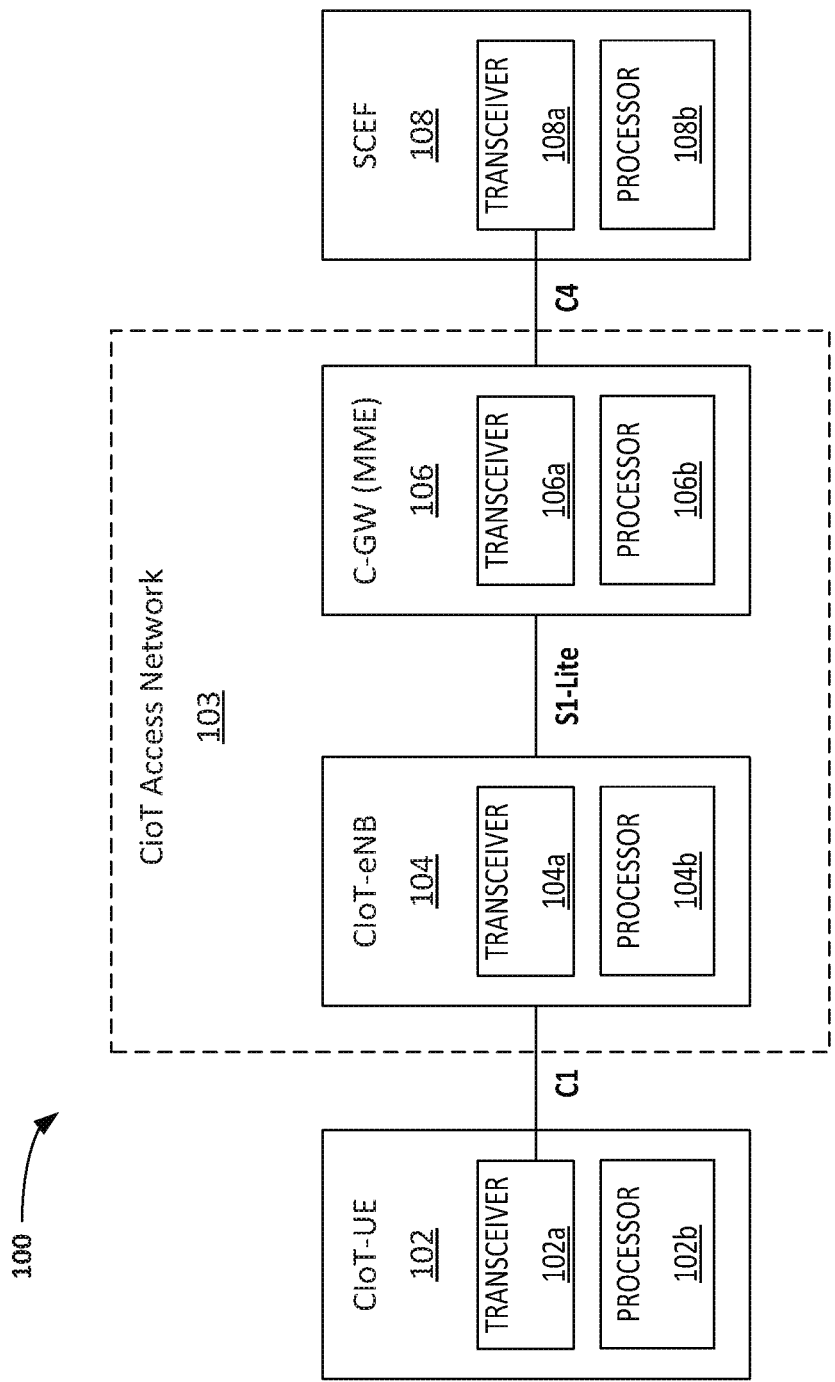
FIG. 1 shows an example set of components in a telecommunications network incorporating CIoT architecture for efficient data transmission.

Illustrative configurations include, but are not limited to, methods, systems, and apparatuses for providing a Cellular Internet of Things (CIoT) architecture particularly suited to non-IP data delivery (NIDD).

Various aspects of the illustrative configurations are described using terms commonly employed by those skilled in the art to convey the substance of their work to others skilled in the art. However, it will be apparent to those skilled in the art that some alternate configurations may be practiced using with portions of the described aspects. For purposes of explanation, specific numbers, materials, and configurations are set forth in order to provide a thorough understanding of the illustrative configurations. However, it will be apparent to one skilled in the art that alternate configurations may be practiced without the specific details. In other instances, well-known features are omitted or simplified in order to not obscure the illustrative configurations.

Further, various operations will be described as multiple discrete operations, in turn, in a manner that is most helpful in understanding the illustrative configurations; however, the order of description should not be construed as to imply that these operations are necessarily order dependent. In particular, these operations need not be performed in the order of presentation.

The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific configurations have been illustrated and described herein, it will be appreciated by those of ordinary skill in the art that a wide variety of alternate and/or equivalent implementations may be substituted for the specific configurations shown and described. This application is intended to cover any adaptations or variations of the configurations discussed herein.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware instructions and/or programs, a combinational logic circuit, and/or other suitable components that provide the described functionality.

While the disclosed configurations are described with reference to an LTE network, the configurations may be used with other types of wireless access networks.

The configurations described herein may be used in a variety of applications including transmitters and receivers of a radio system, although the present invention is not limited in this respect. Radio systems specifically included within the scope of the present invention include, but are not limited to, network interface cards (NICs), network adaptors, fixed or mobile client devices, relays, base stations, femtocells, gateways, bridges, hubs, routers, access points, or other network devices. Further, the radio systems within the scope of the invention may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive configurations could be suitably applied.

It is anticipated that a significant majority of messages expected to be employed in connection with the CIoT will be of small size. Furthermore, many such messages will be characterized by being non-IP. There is disclosed herein CIoT architecture capable of efficiently handling such messages.

There is disclosed herein protocols and procedures to enable efficient non-internet protocol (IP) small data transmission in the cellular internet of things (CIoT) architecture.

There is disclosed herein a design for a C4 interface between the CIoT gateway (C-GW) and a service capability exposure function (SCEF).

There is disclosed herein message procedures and protocol definitions on an interface between a service capability exposure function (SCEF) and a CIoT gateway (CIoT-GW) which supports efficient non-IP data transmission.

FIG. 1 depicts an example system 100 including CIoT architectural components.

A CIoT Access Network 103 is shown comprising a Cellular Internet of Things Evolved Node B (CIoT-eNB) 104 and a Cellular Internet of Things Gateway (C-GW) 106 in communication over an interface, which interface is labelled in the example system as the S1-Lite interface.

The C-GW 106 combines the functionality of a Mobility Management Entity (MME), Serving Gateway (S-GW) and Packet Data Network Gateway (P-GW). Consequently, as a single network node provides the functionality of these three otherwise distinct entities, the data transmission, latency, overall cost and processing complexity can be significantly reduced.

A Cellular Internet of Things User Equipment (CIoT-UE) 102 communicates over an interface, labelled in the example system as the C1 interface, with the CIoT-eNB 104.

There is also shown a Service Capability Exposure Function (SCEF) 108, described in 3GPP TS 23.682 Rel-13, which is the key entity within 3GPP architecture for service capability exposure, providing a means to securely expose services and capability provided by the 3GPP network interfaces. The SCEF 108 is in communication with the C-GW 106 over an interface, which is labeled in the example system as the C4 interface.

Each of the CIoT-UE 102, CIoT-eNB 104, C-GW 106 and SCEF 108 network entities comprise circuitry suitable for implementing their respective functionalities, which circuitry is shown in the example system as comprising a transceiver and a processor. The circuitry of any one network entity may further comprise storage.

The designated labels of the network interfaces: C1; S1-Lite; and C4, are illustrative in nature, and it will readily be appreciated that the same interfaces could be provided by interfaces having alternative labels but otherwise providing the same functionality.

As an example, an interface labelled T6a may provide the C4 interface.

Figure 2:
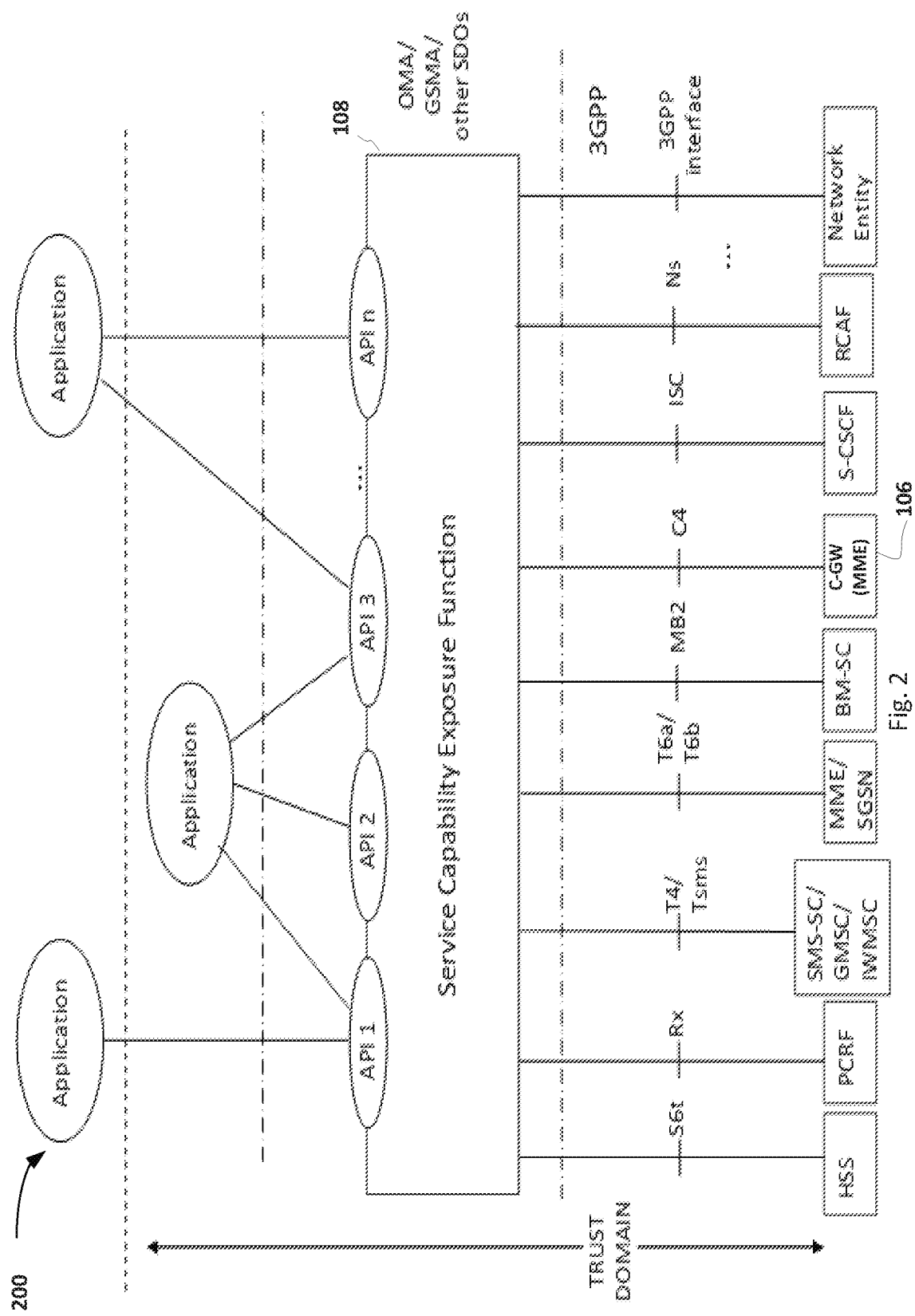
FIG. 2 shows an example of a Service Capability Exposure Function (SCEF) providing an interface with a CIoT Gateway (C-GW)
Figure 4:
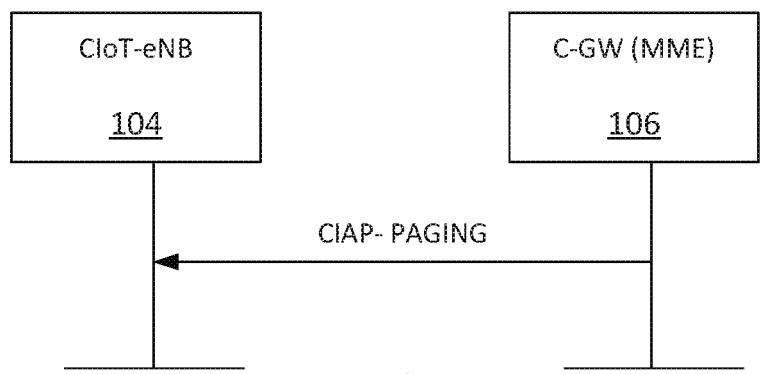
FIG. 4 shows an example paging procedure between a C-GW and a CIoT Evolved Node B (CIoT-eNB)

In the CIoT architecture disclosed herein, with reference to FIG. 2, the C4 interface replaces the T5 interface for interfacing with the Machine Type Communications Interworking Function (MTC-IWF), c.f. FIG. 4.2-2 of 3GPP TS 23.682 Rel-13. Instead, the C-GW 106 directly interconnects with the SCEF 108.

Such direct interconnection between the C-GW 106 and the SCEF 108 offers greatly reduced complexity and cost, and improves efficiency in handling CIoT data by obviating the increased data bandwidth and processing associated with the use of the MTC-IWF over the T5 interface. It offers the possibility for a Combined User Plane and Control Plane (CUPCP).

Figure 3:
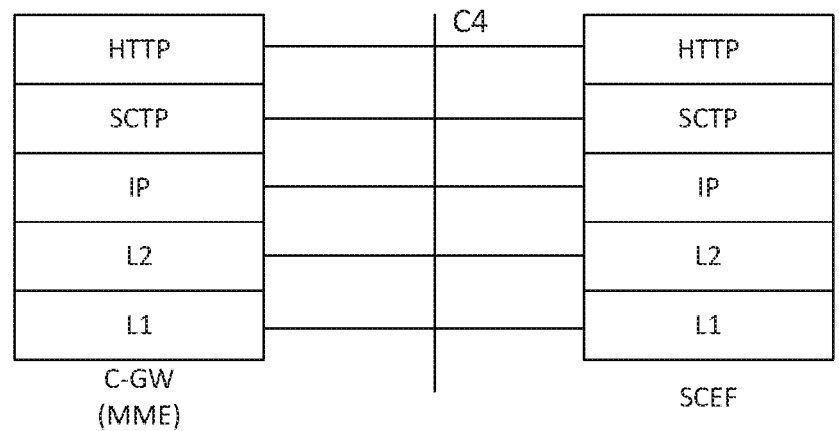
FIG. 3 shows an example protocol stack for use in connection with the interface between the SCEF and the C-GW.

FIG. 3 shows an example protocol stack for the CIoT architecture disclosed herein. The use of HTTP for the application layer facilitates easy-to-write clients and servers and offers high interoperability, cross-platform, cross-language, and ubiquitous caching, proxies and load balancing. As an alternative to HTTP, DIAMETER, or GTP-C/GTP-U transport protocols may be employed.

FIG. 4 shows an example paging procedure between the C-GW 106 and CIoT-eNB 104. The C-GW 106 initiates the paging procedure by sending a CIAP-PAGING message to the CIoT-eNB 104. Paging can be implemented in accordance with 3GPP 45.820 Rel-13 with idle mode power saving mode (PSM).

Figure 5:
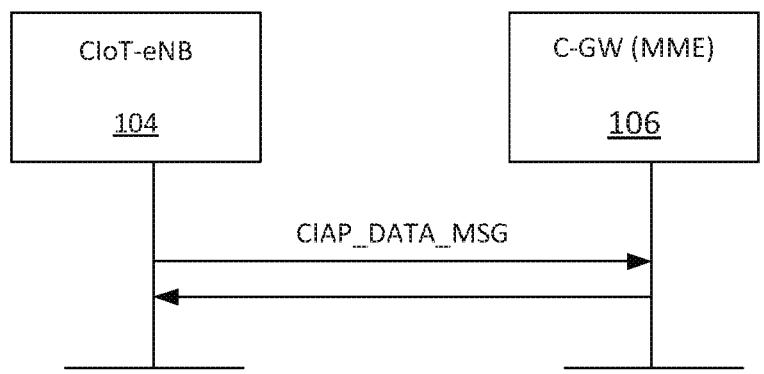
FIG. 5 shows an example of a message flow diagram between a C-GW and a CIoT-eNB.

FIG. 5 shows an example message flow procedure between the C-GW 106 and CIoT-eNB 104.

Figure 6:
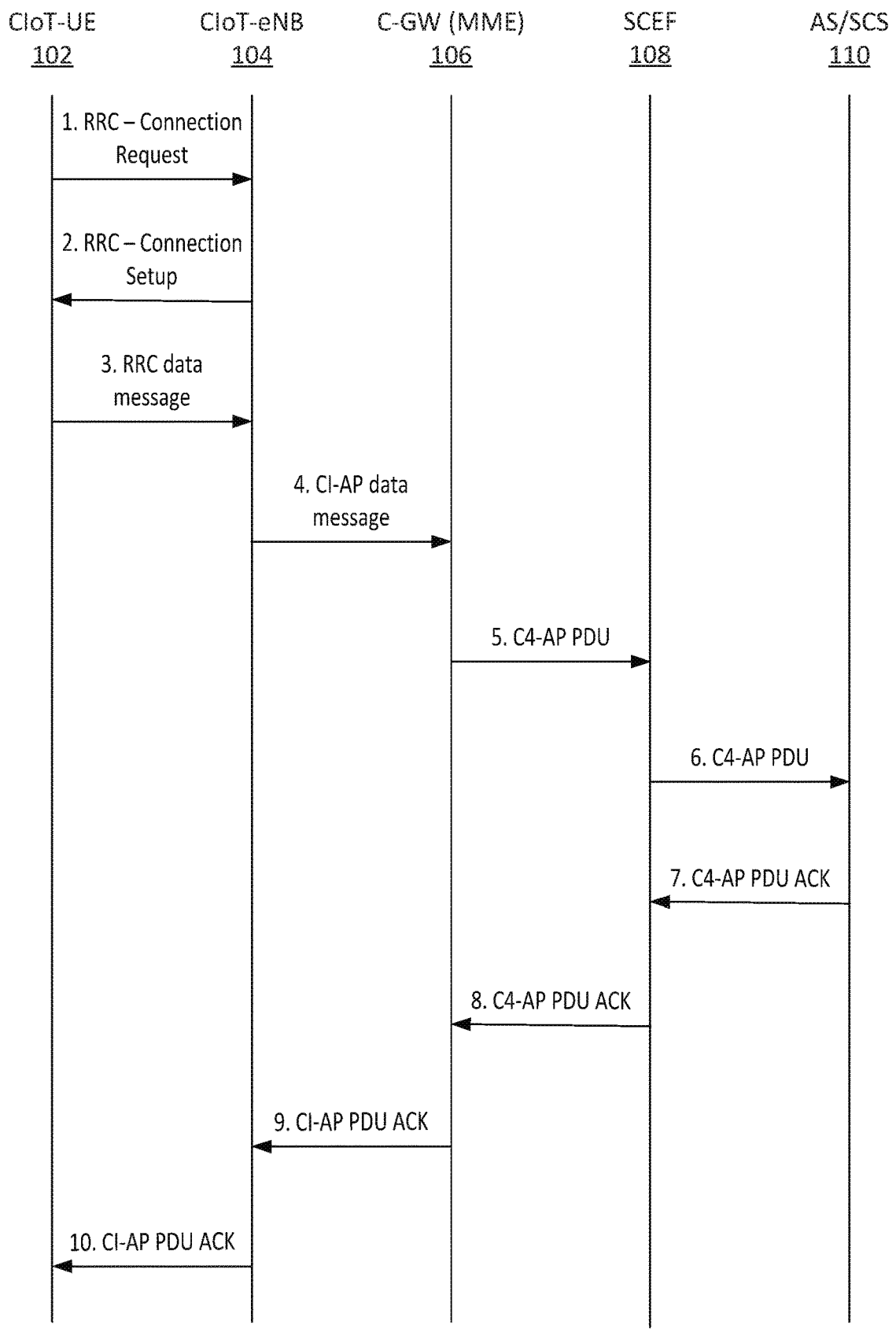
FIG. 6 shows an example messaging procedure for mobile originating (MO) data.

FIG. 6 shows an example messaging procedure associated with machine originating (MO) data transmission.

There is shown the following example messaging steps:

1. Following a request to transfer application data such as an Application Packet Data Unit (A-PDU), which may be encapsulated in an RRC data message, from an application, an idle mode CIoT-UE 102 initiates an RRC Connection Request for sending a small data packet.
2. The CIoT-eNB 104 responds by returning an RRC Connection Setup message. The CIoT-eNB 104 and C-GW 106 establish a signaling connection towards the UE.
3. The UE encapsulates the A-PDU in a NAS Message (e.g. NAS Service Request or NAS Data Service Request) which is encapsulated in a RRC Connection Setup Complete Message shown as a RRC data message in the figure.

The RRC data message may include header and payload data. Within the header, if not already done by the application, the UE may fill the "SENDER" field with its CIoT International Mobile Subscriber Identify (C-IMSI) (if known) or unmodified International Mobile Subscriber Identify (IMSI) or External ID (if known) and places the Service Capability Server/Application Server (SCS/AS) ID in the "RECEIVER" field. The sub address field may include the identity of the application. The UE may perform any wanted security functions, i.e. integrity protection and/or encryption, if not already done by the application.

A Receiver ID can be in the Fully Qualified Domain Name (FQDN) format. The SCEF may maintain an IP tunnel towards the specific SCS/AS and map the FQDN to the Receiver ID.

4. The CIoT-eNB 104 forwards the CI-AP data message to the C-GW 106.
5. The C-GW 106 decrypts, if necessary, the CIAP data message, extracts the RRC data message and sends it over the C4 interface to the SCEF 108 as an encapsulated uplink PDU, shown in the figure as C4-AP PDU. If the RRC data message contains no sender ID, the C-GW 106 may add a sender ID.
6. When the SCEF 108 receives the C4-AP PDU on the C4 interface, it can determine the AS using the 'RECEIVER ID' field in the Small Data Transmission PDU (SDT-PDU) header, and replace the C-IMSI (if indicated as sender ID) or IMSI in unmodified scenarios with a Mobile Station International Subscriber Directory Number (MSISDN) or External ID as 'SENDER ID'.

The SCEF forwards the C4-AP PDU to the AS/SCS 110.

7. If an acknowledgment is requested, the AS returns an appropriate response, labeled in the figure as C4-AP-PDU-Ack, to confirm the transfer of the RRC data message.
8. If an acknowledgement is requested, the SCEF 108 sends the C4-PDU-Ack to the C-GW 106.
9-10. If an acknowledgement is requested, the C-GW 106 sends the CI-AP Ack to the CIoT-UE 102.

In the example messaging procedure described above, the labels associated with the messages RRC Connection Request, RRC Connection Setup, CI-AP data message, C4-AP PDU, C4-AP PDU-ACK, CI-AP data ack, are non-limiting, and the described messages may be considered to represent messages having different labels and otherwise providing the same contextual functionality.

Figure 7:
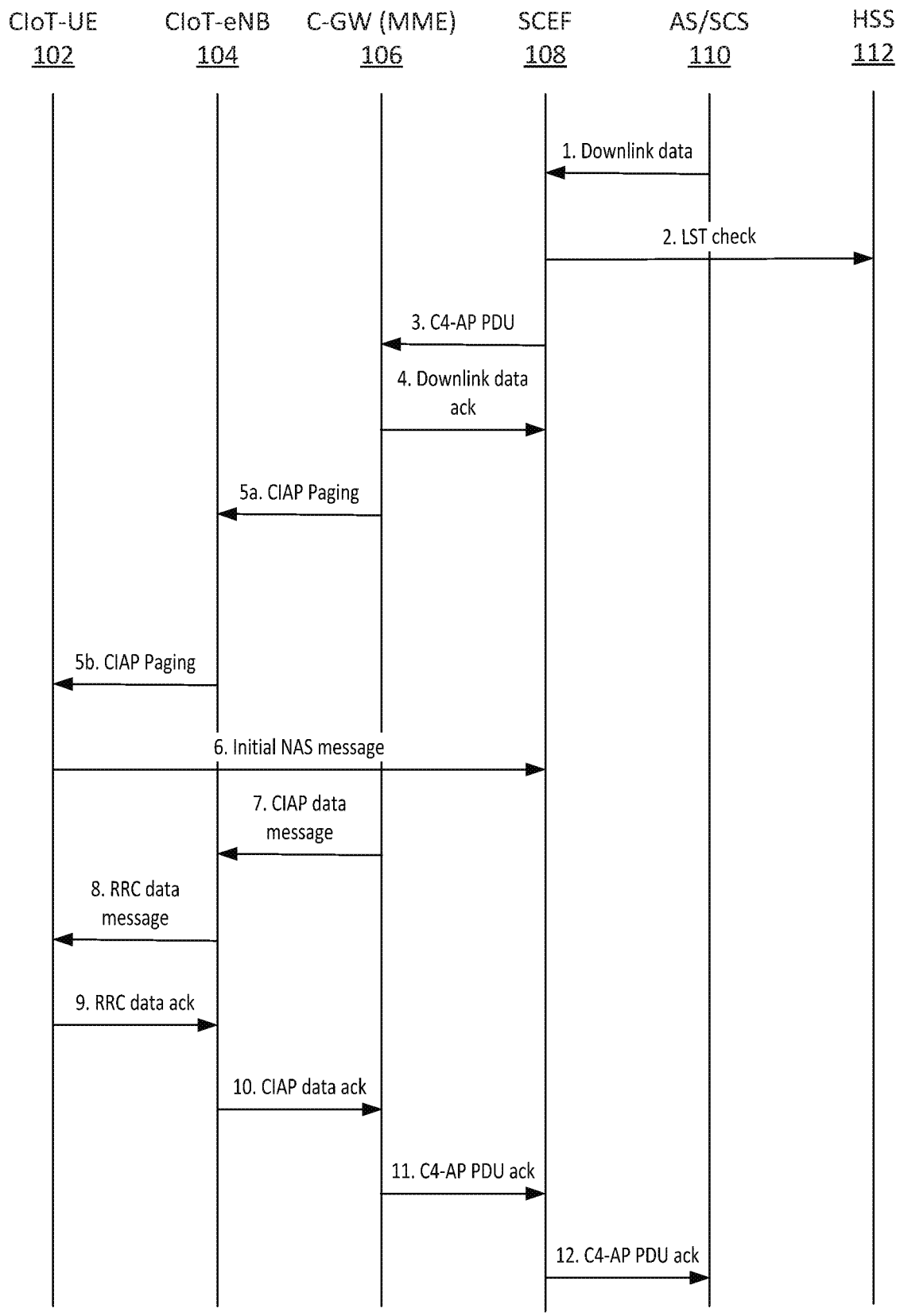
FIG. 7 shows an example messaging procedure for mobile terminating (MT) data.

FIG. 7 shows an example messaging procedure associated with mobile terminating (MT) data transmission.

There is shown the following messaging steps:
1. The AS 110 sends the downlink data and receiver CIoT UE ID (e.g. External ID) to the SCEF 108. The AS may encapsulate an A-PDU containing the downlink data as a downlink PDU which contains the CIoT UE ID. The CIOT UE ID may comprise a globally unique CIoT gateway (GUC-GW) ID and CIoT Temporary Mobile Subscriber Identity (C-TMSI). The AS 110 identifies the CIoT UE 102 by its external identifier or C-IMSI. IMSI is used as the identifier in the cases where the subscriber UE is unmodified to C-IMSI.
2. The HSS 112 is interrogated by the SCEF 108 for a last seen timer check and to retrieve serving node information (e.g. Serving C-GW/MME ID) and map IMSI from the CIoT UE External ID. If the last seen time and the its estimated wake time indicates that the CIoT-UE 102 is in sleep mode, the message may be discarded or stored in C-GW 106 buffer with a countdown counter trigger to set off during an estimated wake time. Upon triggering, the C-GW 106 may attempt to send the message at the estimated wake time. If the last seen time indicates that the CIoT-UE 102 is awake, routing information is obtained for the serving C-GW 106 address. Based on this, C4 association is established through the SCEF 108. C4 association is established between the C-GW 106 and SCEF 108 pair.
3. The SCEF 108 sends a downlink PDU, labelled as a C4-AP PDU in the figure, together with an indication whether a delivery confirmation is needed. The C-IMSI of the CIoT-UE 102 can be included in the downlink PDU. The C-GW 106 receives the C4-AP PDU from the SCEF 108.
4. Downlink data Acknowledgement is sent to the SCEF 108. Each C4 association, when established, can be reused for connections comprising of the same C-GW 106 and SCEF 108 pair. The C-IMSI of the CIoT-UE 102 or IMSI is also retrieved to enable the C-GW 106 to determine the CIoT-UE 102.
5-6. If the CIoT-UE 102 is in idle mode, the CIoT UE 102 sends an initial NAS message (e.g. Service Request or Tracking Are Update (TAU) Request without the active flag) as the paging response carrying the "Key Set Identifier (KSI) and sequence number" IE. The C-GW 106 uses this to verify the message. A signaling connection can thus be established for the CIoT UE 102.
7. The C-GW 106 encapsulates the C4-AP PDU into a downlink PDU, which may be a NAS message, labelled as a CI-AP data message in the figure, and can send the outgoing downlink PDU as a NAS Transport message towards the CIoT-UE 102.
8. The CIoT-eNB 104 forwards the CI-AP data message via a Downlink Information Transfer message to the CIoT-UE 102.
9. When the CIoT-UE 102 receives the RRC data message, it will deliver the CIAP data message or the payload of CIAP data message to the application, e.g. via use of the receiver sub-address. If delivery confirmation is required, the application will ask the CIoT-UE 102 to send a RRC Data ACK carrying confirmation in Uplink Information Transfer message towards the C-GW 106.
10. CIoT-eNB 104 forwards the CIAP Data ACK in Uplink NAS Transport message to the C-GW 106.
11. The C-GW 106 confirms the transfer to the SCEF 108.
12. The SCEF 108 confirms the transfer to the AS/SCS 110.

In the example messaging procedure described above, the labels associated with the messages C4-AP PDU, CIAP Paging, Initial NAS Message, CIAP data message, RRC data message, RRC data ack, CIAP data ack, C4-AP PDU ack, are non-limiting, and the described messages may be considered to represent messages having different labels and otherwise providing the same contextual functionality.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some configurations, the circuitry may be implemented in, or functions associated with the circuitry may be implemented by, one or more software or firmware modules. In some configurations, circuitry may include logic, at least partially operable in hardware.

Figure 9:
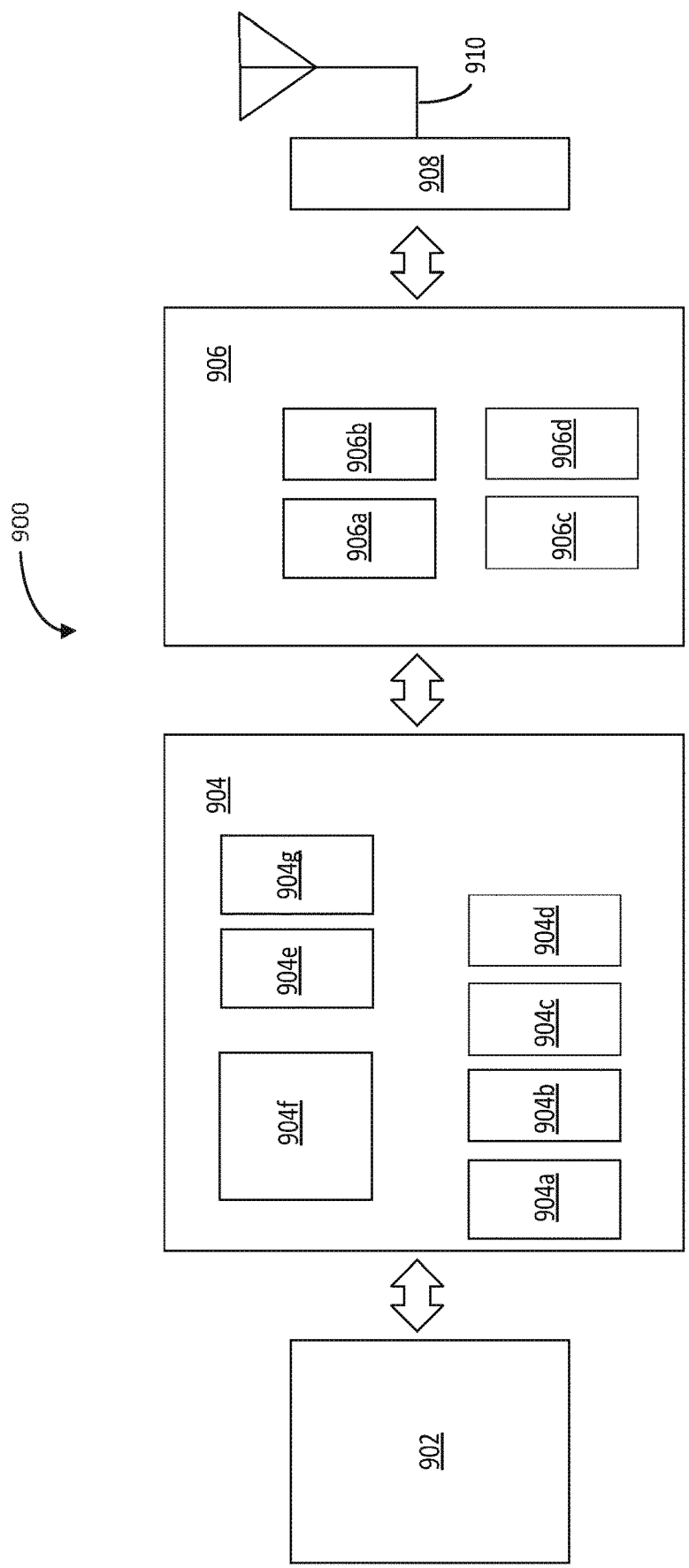
FIG. 9 shows an example system capable of implementing the configurations described herein.

Configurations described herein may be implemented into a system using any suitably configured hardware and/or software. FIG. 9 illustrates, for one configuration, example components of an electronic device 900. In configurations, the electronic device 900 may be, implement, be incorporated into, or otherwise be a part of a user equipment (UE), an evolved NodeB (eNB), a CIoT-UE 102, CIoT-eNB 104, C-GW 106, SCEF 108, AS/SCS 110, HSS 112, or some other electronic device. In some configurations, the electronic device 900 may include application circuitry 902, baseband circuitry 904, Radio Frequency (RF) circuitry 906, front-end module (FEM) circuitry 908 and one or more antennas 910, coupled together at least as shown.

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuity 904 may interface with the application circuitry 902 for generation and processing of the baseband signals and for controlling operations of the RF circuitry 906. For example, in some configurations, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some configurations, modulation/demodulation circuitry of the baseband circuitry 904 may include Fast-Fourier Transform (FFT), precoding, and/or constellation mapping/demapping functionality. In some configurations, encoding/decoding circuitry of the baseband circuitry 904 may include convolution, tail-biting convolution, turbo, Viterbi, and/or Low Density Parity Check (LDPC) encoder/decoder functionality. Configurations of modulation/demodulation and encoder/decoder functionality are not limited to these examples and may include other suitable functionality in other configurations.

In some configurations, the baseband circuitry 904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 may be configured to run elements of the protocol stack for signaling of the PHY, MAC, RLC, PDCP and/or RRC layers. In some configurations, the baseband circuitry may include one or more audio digital signal processor(s) (DSP) 904f. The audio DSP(s) 904f may be include elements for compression/decompression and echo cancellation and may include other suitable processing elements in other configurations.

The baseband circuitry 904 may further include memory/storage 904g. The memory/storage 904g may be used to load and store data and/or instructions for operations performed by the processors of the baseband circuitry 904. Memory/storage for one configuration may include any combination of suitable volatile memory and/or non-volatile memory. The memory/storage 904g may include any combination of various levels of memory/storage including, but not limited to, read-only memory (ROM) having embedded software instructions (e.g., firmware), random access memory (e.g., dynamic random access memory (DRAM)), cache, buffers, etc.

The memory/storage 904g may be shared among the various processors or dedicated to particular processors.

Components of the baseband circuitry may be suitably combined in a single chip, a single chipset, or disposed on a same circuit board in some configurations. In some configurations, some or all of the constituent components of the baseband circuitry 904 and the application circuitry 902 may be implemented together such as, for example, on a system on a chip (SOC).

In some configurations, the baseband circuitry 904 may provide for communication compatible with one or more radio technologies. For example, in some configurations, the baseband circuitry 904 may support communication with an evolved universal terrestrial radio access network (EUTRAN) and/or other wireless metropolitan area networks (WMAN), a wireless local area network (WLAN), a wireless personal area network (WPAN). Configurations in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various configurations, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some configurations, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some configurations, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some configurations, the output baseband signals may be zero-frequency baseband signals, although this is not a requirement. In some configurations, mixer circuitry 906a of the receive signal path may comprise passive mixers, although the scope of the configurations is not limited in this respect.

In some configurations, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the configurations is not limited in this respect.

In some configurations, the mixer circuitry 906a of the receive signal path and the mixer circuitry 906a of the transmit signal path may include two or more mixers and may be arranged for quadrature downconversion and/or upconversion respectively. In some configurations, the mixer circuitry 906a of the receive signal path and the mixer circuitry 906a of the transmit signal path may include two or more mixers and may be arranged for image rejection (e.g., Hartley image rejection). In some configurations, the mixer circuitry 906a of the receive signal path and the mixer circuitry 906a may be arranged for direct downconversion and/or direct upconversion, respectively. In some configurations, the mixer circuitry 906a of the receive signal path and the mixer circuitry 906a of the transmit signal path may be configured for super-heterodyne operation.

In some configurations, the output baseband signals and the input baseband signals may be analog baseband signals, although the scope of the configurations is not limited in this respect. In some alternate configurations, the output baseband signals and the input baseband signals may be digital baseband signals. In these alternate configurations, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode configurations, a separate radio IC circuitry may be provided for processing signals for each spectrum, although the scope of the configurations is not limited in this respect.

In some configurations, the synthesizer circuitry 906d may be a fractional-N synthesizer or a fractional N/N+1 synthesizer, although the scope of the configurations is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some configurations, the synthesizer circuitry 906d may be a fractional N/N+1 synthesizer.

In some configurations, frequency input may be provided by a voltage controlled oscillator (VCO), although that is not a requirement. Divider control input may be provided by either the baseband circuitry 904 or the applications processor 902 depending on the desired output frequency. In some configurations, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some configurations, the divider may be a dual modulus divider (DMD) and the phase accumulator may be a digital phase accumulator (DPA). In some configurations, the DMD may be configured to divide the input signal by either N or N+1 (e.g., based on a carry out) to provide a fractional division ratio. In some example configurations, the DLL may include a set of cascaded, tunable, delay elements, a phase detector, a charge pump and a D-type flip-flop. In these configurations, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some configurations, synthesizer circuitry 906d may be configured to generate a carrier frequency as the output frequency, while in other configurations, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some configurations, the output frequency may be a LO frequency (fLO). In some configurations, the RF circuitry 906 may include an IQ/polar converter.

FEM circuitry 908 may include a receive signal path which may include circuitry configured to operate on RF signals received from one or more antennas 190, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 190.

In some configurations, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some configurations, the electronic device 900 may include additional elements such as, for example, memory/storage, display, camera, sensor, and/or input/output (I/O) interface.

In some configurations, the electronic device 900 may be configured to perform one or more processes, techniques, and/or methods as described herein, or portions thereof.

Figure 8:
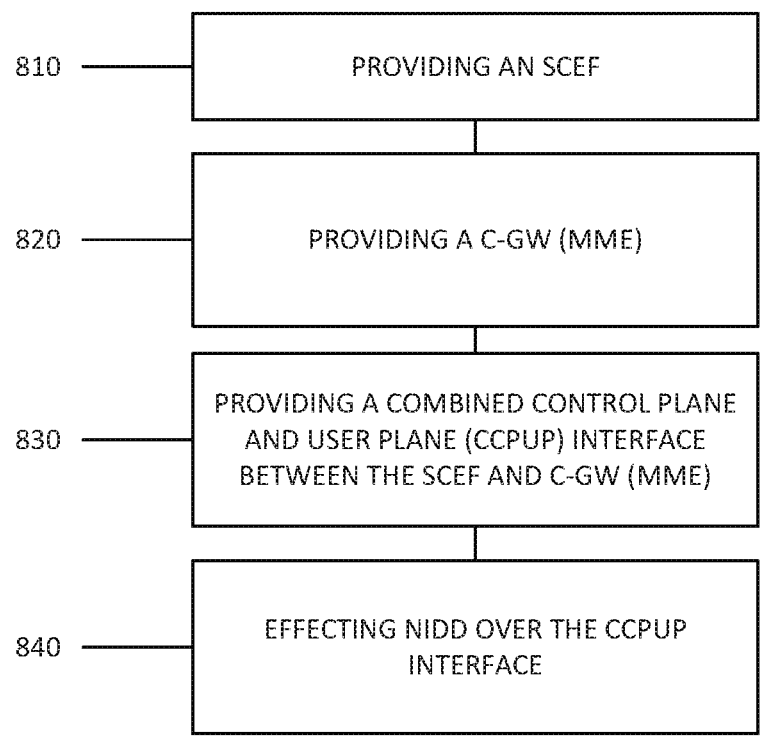
FIG. 8 shows an example of a method of implementing non-IP data delivery (NIDD)

An example method is shown in FIG. 8, and comprises providing an SCEF 810; providing a C-GW (MME) 820; providing a combined control plane and user plane (CCPUP) interface between the SCEF and C-GW (MME) 830; and effecting NIDD over the CCPUP interface 840.

Figure 10:
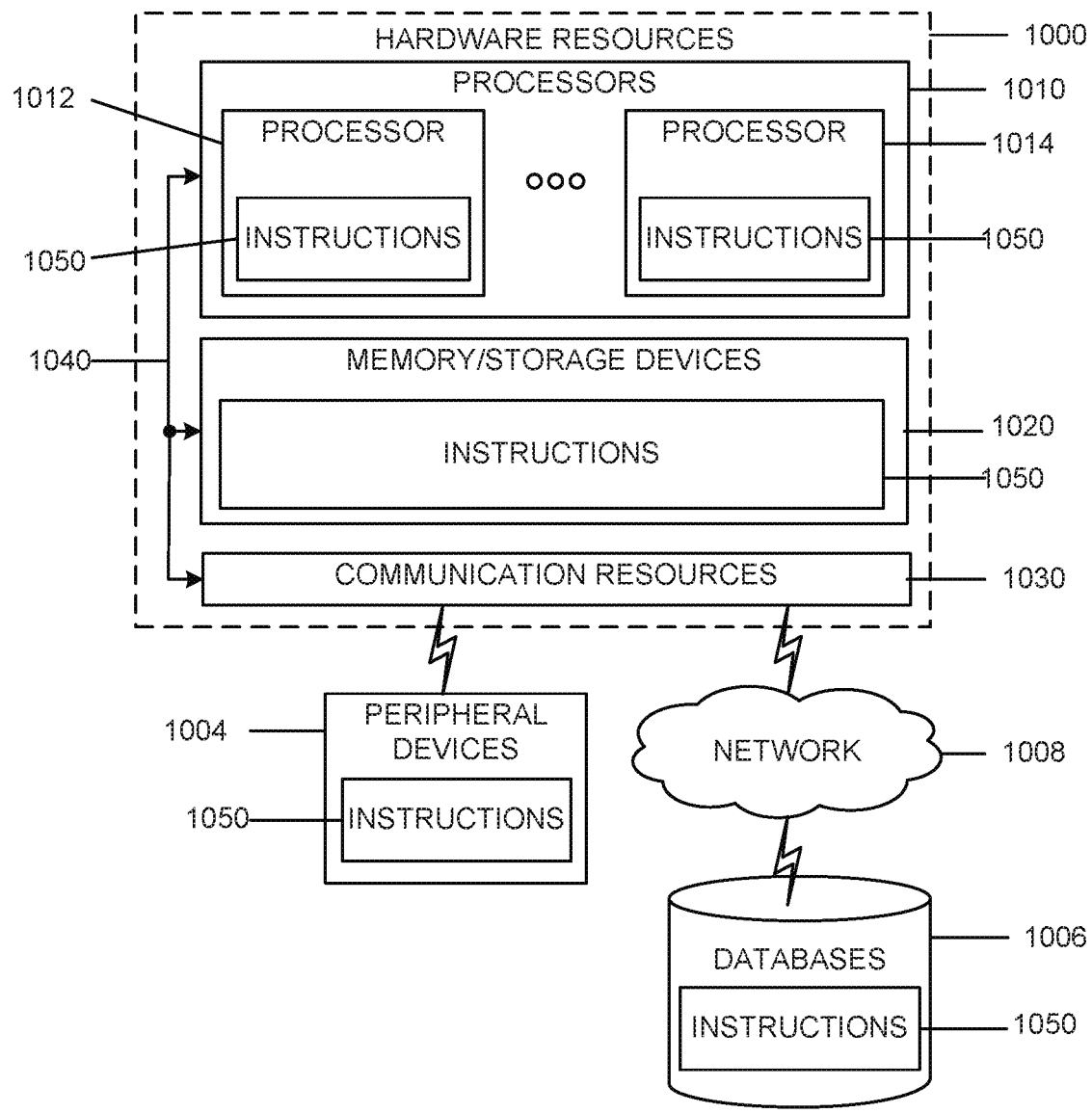
FIG. 10 shows an example of a set of components able to read instructions from a machine-readable or computer-readable medium (e.g., a machine-readable storage medium) and perform any one or more of the methodologies discussed herein.

FIG. 10 is a block diagram illustrating components, according to some example embodiments, able to read instructions from a machine-readable or computer-readable medium (e.g., a machine-readable storage medium) and perform any one or more of the methodologies discussed herein. Specifically, FIG. 10 shows a diagrammatic representation of hardware resources 600 including one or more processors (or processor cores) 1010, one or more memory/storage devices 1020, and one or more communication resources 1030, each of which are communicatively coupled via a bus 1040.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014. The memory/storage devices 1020 may include main memory, disk storage, or any suitable combination thereof.

The communication resources 1030 may include interconnection and/or network interface components or other suitable devices to communicate with one or more peripheral devices 1004 and/or one or more databases 1006 via a network 1008. For example, the communication resources 1030 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 and/or the databases 1006. Accordingly, the memory of processors 1010, the memory/storage devices 1020, the peripheral devices 1004, and the databases 1006 are examples of computer-readable and machine-readable media.

The following numbered examples also form part of the disclosure.

Example 1 includes a Service capability exposure function (SCEF) that operates as a machine type communication interworking function (MTC-IWF).

In Example 2, the subject matter of Example 1 or any of the Examples or Configurations described herein may include SCEF interfaces with C-GW (Cellular internet of things gateway) which is in cellular internet of things (CIoT) Access Network, on C4 interface.

In Example 3, the subject matter of Example 2 or any of the Examples or Configurations described herein may include Hypertext transfer protocol (HTTP) is used for applications on the C4 interface.

In Example 4, the subject matter of Example 2 or any of the Examples or Configurations described herein may include for non internet protocol (non-IP) small data transmission, C4-AP protocol data unit (PDU) is sent by C-GW to SCEF on C4 interface.

Example 5 includes a User equipment (UE) that encapsulates radio resource control (RRC) data message to send to CIoT evolved NodeB (eNB) from CIoT-UE.

Example 6 includes a C-GW that acts as interface towards SCEF using C4 interface.

In Example 7, the subject matter of any of the Examples or Configurations described herein may include for MO small data transmission, where UE fills the sender field with its cellular international mobile subscriber identity (C-IMSI) or unmodified IMSI.

In Example 8, the subject matter of any of the Examples or Configurations described herein may include for MO small data transmission, where UE fills the receiver field with fully qualified domain name (FQDN) of service capability server/application server (SCS/AS).

In Example 9, the subject matter of any of the Examples or Configurations described herein may include for MO small data transmission, where CIoT-eNB forwards the CIAP data message to the C-GW.

In Example 10, the subject matter of any of the Examples or Configurations described herein may include for MO small data transmission and MT small data transmission, where SCEF sends and receives the C4-AP Data message on C4 interface.

In Example 11, the subject matter of any of the Examples or Configurations described herein may include For MO small data transmission, where SCEF forwards the C4AP-PDU to SCS/AS.

In Example 12, the subject matter of any of the Examples or Configurations described herein may include for MO small data transmission, where the service capability server/application server (SCS/AS) returns an appropriate response, i.e. a C4-AP-PDU-Ack to confirm the transfer of the radio resource control (RRC) data message, if an acknowledgment is requested.

In Example 13, the subject matter of any of the Examples or Configurations described herein may include For MO small data transmission, where the C-GW sends an CIAP-Ack to the UE if the acknowledgment is requested by C-GW.

In Example 14, the subject matter of Example 1 or any of the Examples or Configurations described herein may include may include for MT small data transmission, where the AS/SCS sends receiver CIoT UE ID and downlink small data to SCEF.

In Example 15, the subject matter of Example 14 or any of the Examples or Configurations described herein may include for MT small data transmission, CIoT UE ID comprises of external ID or (globally unique CIoT gateway) GUC-GW ID and cellular temporary mobile subscriber identity (C-TMSI).

In Example 16, the subject matter of Example 1, 2 or any of the Examples or Configurations described herein may include for MT small data transmission, the home subscriber server (HSS) is interrogated by SCEF for last seen timer check and optionally to retrieve serving node information (e.g. Serving C-GW/MME ID) and map IMSI from CIoT UE external ID, before SCEF sends the C4AP-PDU and before retrieving the routing information to send the C4AP the destination C-GW.

In Example 17, the subject matter of any of the Examples or Configurations described herein may include for MT small data transmission, the incoming message is discarded/stored in C-GW buffer with a countdown counter trigger to set off during the estimated wake time of the UE.

In Example 18, the subject matter of any of the Examples or Configurations described herein may include for MT small data transmission, for the messages stored in C-GW buffer, with the set off of the counter, C-GW attempts to send the message again during the estimated wake time.

In Example 19, the subject matter of Example 16 or any of the Examples or Configurations described herein may include for MT small data transmission, if the last seen time check in Example 16 indicates that the CIoT-UE is awake, routing information is obtained for the serving C-GW address. Based on this, C4 association is established through SCEF.

In Example 20, the subject matter of Example 10 or any of the Examples or Configurations described herein may include for MT small data transmission, The SCEF sends C4-AP PDU together with an indication whether a delivery confirmation is needed.

In Example 21, the subject matter of Example 10 or any of the Examples or Configurations described herein may include for MT small data transmission, the C-IMSI of the CIoT-UE is included in the C4-AP PDU.

In Example 22, the subject matter of any of the Examples or Configurations described herein may include for MT small data transmission, each C4 association when established, can be reused for connections comprising of the same C-GW SCEF pair.

In Example 23, the subject matter of any of the Examples or Configurations described herein may include for MT small data transmission, if UE is in idle mode, The UE sends an initial NAS message as the paging response carrying the "KSI and sequence number" IE. The C-GW may use this to verify the message.

In Example 24, the subject matter of any of the Examples or Configurations described herein may include for MT small data transmission, the C-GW encapsulates the C4-AP PDU in example 10 into NAS message called CIAP data message and sends the message in downlink NAS Transport message to the UE.

In Example 25, the subject matter of any of the Examples or Configurations described herein may include for MT small data transmission, CIoT-eNB forwards the CIAP data message in Downlink Information Transfer message to the UE.

In Example 26, the subject matter of any of the Examples or Configurations described herein may include for MT small data transmission, When the CIoT-UE receives the RRC data message, it will deliver the CIAP data message in example 25 or the payload of CIAP data message to the application.

In Example 27, the subject matter of any of the Examples or Configurations described herein may include for MT small data transmission, CIoT-eNB forwards the CIAP Data ACK in Uplink NAS Transport message to the C-GW.

In Example 28, the subject matter of any of the Examples or Configurations described herein may include for MT small data transmission, CIAP Data Ack discussed in example 27 is sent by C-GW to SCEF.

In Example 29, the subject matter of Examples 1-28 or any of the Examples or Configurations described herein may include an apparatus comprising means to perform one or more elements of a method described in or related to any of the Examples 1-28, or any other method or process described herein.

In Example 30, the subject matter of Examples 1-29 or any of the Examples or Configurations described herein may include one or more non-transitory computer-readable media comprising instructions to cause an electronic device, upon execution of the instructions by one or more processors of the electronic device, to perform one or more elements of a method described in or related to any of Examples 1-28, or any other method or process described herein.

In Example 31, the subject matter of Examples 1-28 or any of the Examples or Configurations described herein may include an apparatus comprising logic, modules, and/or circuitry to perform one or more elements of a method described in or related to any of Examples 1-28, or any other method or process described herein.

In Example 32, the subject matter of Examples 1-28 or any of the Examples or Configurations described herein may include a method, technique, or process as described in or related to any of Examples 1-28, or portions or parts thereof.

Example 33 includes a method of communicating in a wireless network as shown and described herein.

Example 34 includes a system for providing wireless communication as shown and described herein.

Example 35 includes a device for providing wireless communication as shown and described herein.

The following numbered clauses form additional configurations and also form part of the present disclosure.

Clause 1 includes a Service Capability Exposure Function (SCEF) for use in a cellular communications network, the SCEF comprising circuitry to: send and receive Application Packet Data Units (A-PDUs) over an interface interconnecting the SCEF and a Cellular Internet of Things Gateway (C-GW) combining the functionality of a Mobility Management Entity (MME), a Serving gateway (S-GW) and a Packet data network gateway (P-GW).

Clause 1 may alternatively include a Service Capability Exposure Function (SCEF) for use in a cellular communications network, the SCEF comprising circuitry to: exchange MME, S-GW and P-GW data over an interface interconnecting the SCEF and a Cellular Internet of Things Gateway (C-GW) combining the functionality of a Mobility Management Entity (MME), a Serving gateway (S-GW) and a Packet data network gateway (P-GW).

In Clause 2, there is provided the subject matter of Clause 1 or any of the Clauses or Examples described herein, wherein: the interface is a Combined User Plane and Control Plane (CUPCP) interface.

In Clause 3, there is provided the subject matter of Clause 1-2 or any of the Clauses or Examples described herein, wherein: the interface employs HTTP.

In Clause 4, there is provided the subject matter of any preceding Clause or any of the Clauses or Examples described herein, wherein: the A-PDUs communicate non-IP data.

In Clause 5, there is provided the subject matter of any preceding Clause or any of the Clauses or Examples described herein, the circuitry to: communicate with at least one Application Server/Service Capability Server (AS/SCS).

In Clause 6, there is provided the subject matter of Clause 5 or any of the Clauses or Examples described herein, the circuitry to: receive from the C-GW an uplink Packet Data Unit (PDU) encapsulating an uplink A-PDU; determine from the uplink PDU a destination AS/SCS to receive the A-PDU; and forward the uplink PDU to the destination AS/SCS.

In Clause 7, there is provided the subject matter of Clause 5-6 or any of the Clauses or Examples described herein, the circuitry to: receive from the at least one AS/SCS an incoming downlink PDU encapsulating a downlink A-PDU; determine from the downlink PDU a destination User Equipment (UE) to receive the downlink A-PDU; and communicate with a Home Subscriber Server (HSS) to perform a last seen timer check in respect of the destination UE.

In Clause 8, there is provided the subject matter of Clause 7 or any of the Clauses or Examples described herein, the circuitry to: in the event that the last seen timer check indicates that the destination UE is in an awake state, encapsulate the downlink A-PDU in an outgoing downlink PDU and send the outgoing downlink PDU to the C-GW.

In Clause 9, the subject matter of Clause 7-8 or any of the Clauses or Examples described herein, the circuitry to: in the event that the last seen timer check indicates that the destination UE is in a sleep state, buffer the downlink PDU and estimate the wake time; and at the estimated wake time, encapsulate the downlink A-PDU in an outgoing downlink PDU and send the outgoing downlink PDU to the C-GW.

In Clause 10 there is provided a Cellular Internet of Things Gateway (C-GW) for use in a cellular communications network, the C-GW comprising circuitry to: send and receive Application Packet Data Units (A-PDUs) over an interface interconnecting the C-GW and a Service Capability Exposure Function (SCEF), wherein: the C-GW combines the functionality of a Mobility Management Entity (MME), a Serving gateway (S-GW) and a Packet data network gateway (P-GW).

In Clause 11, there is provided the subject matter of Clause 10 or any of the Clauses or Examples described herein, wherein: the interface is a Combined User Plane and Control Plane (CUPCP) interface.

In Clause 12, there is provided the subject matter of Clause 10 or Clause 11 or any of the Clauses or Examples described herein, the circuitry to: receive from an Evolved Node B (eNB) an incoming uplink Packet Data Unit (PDU), the uplink PDU being a Non Access Statum (NAS) message encapsulating an uplink A-PDU; encapsulate the uplink A-PDU in an outgoing uplink PDU; and send the outgoing uplink PDU to the SCEF.

In Clause 13, there is provided the subject matter of Clause 12 or any of the Clauses or Examples described herein, the circuitry to: add a sending User Equipment (UE) identifier to the outgoing uplink PDU in the event that the incoming uplink PDU comprises no sending UE identifier.

In Clause 14, there is provided the subject matter of Clause 10-13 or any of the Clauses or Examples described herein, the circuitry to: receive from the SCEF an incoming downlink PDU encapsulating a downlink A-PDU; determine from the downlink PDU the destination User Equipment (UE) to receive the downlink A-PDU; encapsulate the A-PDU in an outgoing downlink PDU, the outgoing downlink PDU being a Non Access Stratum (NAS) message; and send the outgoing downlink PDU to an Evolve Node B (eNB) serving the destination UE.

In Clause 15, there is provided the subject matter of Clause 14 or any of the Clauses or Examples described herein, the circuitry to: following receipt of the downlink PDU, communicate with a Home Subscriber Server (HSS) to perform a last seen timer check in respect of the destination UE.

In Clause 16, there is provided the subject matter of Clause 15 or any of the Clauses or Examples described herein, the circuitry to: in the event that the destination UE is in a sleep state, buffer the A-PDU and estimate the destination UE wake time; and at the estimated wake time, send the outgoing downlink PDU to the Evolved Node B (eNB) serving the destination UE.

Clause 17 includes a User Equipment (UE) for use in a cellular communications network, the UE comprising circuitry to: send and receive Packet Data Units (PDUs) over an interface interconnecting the UE and an Evolved Node B (eNB); and encapsulate an Application Packet Data Unit (A-PDU) into an uplink PDU, the uplink PDU specifying a sender identifier, the sender identifier identifying the UE, and a receiver identifier, the receiver identifier identifying a destination AC/SCS to receive the A-PDU.

In Clause 18, there is provided the subject matter of Clause 17 or any of the Clauses or Examples described herein, the circuitry to: receive a downlink PDU; and extract from the downlink PDU a downlink A-PDU.

In Clause 19, there is provided the subject matter of Clause 17 or 18 or any of the Clauses or Examples described herein, wherein: the encapsulated uplink PDU is a Non Access Stratum (NAS) message.

Clause 20 includes a method of Non-IP Data Delivery (NIDD) comprising: providing a Service Capability Exposure Function (SCEF); providing a Cellular Internet of Things Gateway (C-GW) combining the functionality of an Mobility Management Entity (MME), a Serving gateway (S-GW) and a Packet data network gateway (P-GW) and providing an interface interconnecting the SCEF and the MME.

In Clause 21, there is provided the subject matter of Clause 20 or any of the Clauses or Examples described herein, wherein: the interface is a Combined User Plane and Control Plane (CUPCP) interface.

In Clause 22, there is provided the subject matter of Clause 20 or 21 or any of the Clauses or Examples described herein, comprising: communicating non-IP data over the interface.

In Clause 23, there is provided the method of any one of Clauses 20-22 or any of the Clauses or Examples described herein, wherein: the SCEF is the SCEF according to any Clause or Example above; and/or the C-GW is the C-GW according to any Clause or Example above.

In Clause 24, there is provided a computer readable medium comprising computer program instructions that when executed on a processor perform the method of Clauses 20-23 or any of the Clauses or Examples described herein.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

The invention claimed is:

1. A system comprising:
a Cellular Internet of Things Gateway (C-GW) combining functionality of a Mobility Management Entity (MME), Serving Gateway (S-GW), and Packet Data Network Gateway (P-GW), wherein the C-GW is directly coupled to a Cellular Internet of Things-Evolved Node B (CIoT-eNB) via a first interface;
one or more processors; and
a non-transitory computer-readable storage medium coupled to the one or more processors and storing programming instructions for execution by the one or more processors, the programming instructions instructing the one or more processors to perform operations comprising:
receiving, from the CIoT-eNB and via the first interface, an incoming uplink PDU encapsulating an incoming Application Packet Data Unit (A-PDU), wherein the incoming uplink PDU comprises a receiver identifier that identifies a destination Application Server (AS)/Service Capability Server (SCS) to receive the incoming A-PDU;
encapsulating the incoming A-PDU in an outgoing uplink PDU;
in response to determining that incoming uplink PDU does not include a UE identifier, adding the UE identifier to the outgoing uplink PDU; and
sending, via a second interface directly coupling the C-GW and a Service Capability Exposure Function (SCEF), the outgoing uplink PDU to the SCEF, wherein the SCEF is configured to route the outgoing uplink PDU to the destination AS/SCS.

2. The system of claim 1, the operations further comprising:
receiving, from the SCEF and via the second interface, an acknowledgment receipt acknowledging that the destination AS/SC S received the incoming A-PDU; and
sending, via the first interface, the acknowledgment receipt to the CIoT-eNB.

3. The system of claim 1, wherein the CIoT-eNB is a first CIoT-eNB, wherein the C-GW is coupled to a plurality of CIoT-eNBs, and wherein the operations further comprise:
receiving, from the SCEF and via the second interface, an incoming downlink PDU encapsulating a downlink A-PDU;

determining, from the downlink PDU, a destination UE to receive the downlink A-PDU;
encapsulating the A-PDU in an outgoing downlink PDU, wherein the outgoing downlink is a Non Access Stratum (NAS) message; and
sending the outgoing downlink PDU to a respective CIoT-eNB of the plurality serving the destination UE.

4. The system of claim 3, further comprising:
in response to receiving the downlink PDU, communicating with a Home Subscriber Server (HSS) to perform a last seen timer check of the destination UE.

5. The system of claim 4, further comprising:
in response to determining that the UE is in a sleep state, buffering the downlink A-PDU and estimating a wake time of the destination UE; and
at the estimated wake time, sending the outgoing downlink PDU to the respective CIoT-eNB serving the destination UE.

6. The system of claim 1, wherein the second interface is a Combined User Plane and Control Plane (CUPCP) interface.

7. The system of claim 1, wherein the second interface employs HTTP.

8. The system of claim 1, wherein the incoming A-PDU communicates non-IP data.

9. The system of claim 1, wherein the uplink PDU is a Non Access Statum (NAS) message.

10. The system of claim 1, wherein the SCEF is directly coupled to the destination AS/SCS via a third interface.

11. In a communication system comprising a Cellular Internet of Things Gateway (C-GW) directly coupled to a Cellular Internet of Things-Evolved Node B (CIoT-eNB) via a first interface, wherein the CIoT-eNB serves a plurality of user equipment devices (UEs), a method comprising:
receiving from a first UE of the plurality, an incoming uplink PDU encapsulating an incoming Application Packet Data Unit (A-PDU), wherein the incoming uplink PDU comprises a receiver identifier that identifies a destination Application Server (AS)/Service Capability Server (SCS) to receive the incoming A-PDU, and wherein the C-GW combines functionality of a Mobility Management Entity (MME), Serving Gateway (S-GW), and Packet Data Network Gateway (P-GW);
encapsulating the incoming A-PDU in an outgoing uplink PDU;
in response to determining that incoming uplink PDU does not include a UE identifier, adding the UE identifier to the outgoing uplink PDU; and
sending, via a second interface directly coupling the C-GW and a Service Capability Exposure Function (SCEF), the outgoing uplink PDU to the SCEF, wherein the SCEF is configured to route the outgoing uplink PDU to the destination AS/SC S.

12. The method of claim 11, further comprising:
receiving, from the SCEF and via the second interface, an acknowledgment receipt acknowledging that the destination AS/SC S received the incoming A-PDU; and
sending the acknowledgment receipt to the first UE.

13. The method of claim 11, further comprising:
receiving, from the SCEF and via the second interface, an incoming downlink PDU encapsulating a downlink A-PDU;
determining, from the downlink PDU, a destination UE of the downlink A-PDU, wherein the destination UE is one of the plurality of UEs served by the CIoT-eNB;
encapsulating the A-PDU in an outgoing downlink PDU, wherein the outgoing downlink is a Non Access Stratum (NAS) message; and
sending the outgoing downlink PDU to the destination UE.

14. The method of claim 13, further comprising:
in response to receiving the downlink PDU, communicating with a Home Subscriber Server (HSS) to perform a last seen timer check of the destination UE.

15. The method of claim 14, further comprising:
in response to determining that the UE is in a sleep state, buffering the downlink A-PDU and estimating a wake time of the destination UE; and
at the estimated wake time, sending the outgoing downlink PDU to the destination UE.

16. The method of claim 11, wherein the second interface is a Combined User Plane and Control Plane (CUPCP) interface.

17. The method of claim 11, wherein the second interface employs HTTP.

18. A non-transitory computer-readable storage medium coupled to one or more processors and storing programming instructions for execution by the one or more processors, the programming instructions instructing the one or more processors to perform operations comprising:
receiving, by a Cellular Internet of Things Gateway (C-GW), an incoming uplink PDU encapsulating an incoming Application Packet Data Unit (A-PDU), wherein the incoming uplink PDU comprises a receiver identifier that identifies a destination Application Server (AS)/Service Capability Server (SCS) to receive the incoming A-PDU, and wherein the C-GW combines functionality of a Mobility Management Entity (MME), a Serving gateway (SGW) and a Packet data network gateway (P-GW);
encapsulating the incoming A-PDU in an outgoing uplink PDU;
in response to determining that incoming uplink PDU does not include a UE identifier, adding the UE identifier to the outgoing uplink PDU; and
sending, via a first interface directly coupling the C-GW and a Service Capability Exposure Function (SCEF), the outgoing uplink PDU to the SCEF, wherein the SCEF is configured to route the outgoing uplink PDU to the destination AS/SCS.

* * * * *

UNITED STATES PATENT AND TRADEMARK OFFICE
CERTIFICATE OF CORRECTION

PATENT NO. : 10,887,742 B2
APPLICATION NO. : 15/743574
DATED : January 5, 2021
INVENTOR(S) : Puneet K. Jain and Sneha Nagarajan Page 1 of 1

It is certified that error appears in the above-identified patent and that said Letters Patent is hereby corrected as shown below:

In the Claims

Column 16, Line 59, Claim 2, delete "AS/SC S" and insert -- AS/SCS --;

Column 17, Line 28, Claim 9, delete "Statum" and insert -- Stratum --;

Column 17, Line 56, Claim 11, delete "AS/SC S." and insert -- AS/SCS. --; and

Column 18, Line 4, Claim 12, delete "AS/SC S" and insert -- AS/SCS --.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*